US012135392B2

(12) United States Patent
Neustadt

(10) Patent No.: US 12,135,392 B2
(45) Date of Patent: Nov. 5, 2024

(54) LIDAR SENSOR

(71) Applicant: Robert Bosch GmbH, Stuttgart (DE)

(72) Inventor: Alf Neustadt, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1011 days.

(21) Appl. No.: 17/095,843

(22) Filed: Nov. 12, 2020

(65) Prior Publication Data

US 2021/0156971 A1     May 27, 2021

(30) Foreign Application Priority Data

Nov. 22, 2019    (DE) .......................... 102019218005.1

(51) Int. Cl.
    *G01S 7/481*     (2006.01)
    *B08B 1/14*     (2024.01)
    *G01S 17/931*     (2020.01)

(52) U.S. Cl.
    CPC ............ *G01S 7/4817* (2013.01); *B08B 1/143* (2024.01); *G01S 7/4813* (2013.01); *G01S 7/4814* (2013.01); *G01S 17/931* (2020.01)

(58) Field of Classification Search
    CPC ................................ G01S 7/481; G01S 17/931
    See application file for complete search history.

(56) References Cited

U.S. PATENT DOCUMENTS 5,546,188 A    8/1996   Wangler et al.
6,410,993 B1    6/2002   Giers
2009/0283666 A1 * 11/2009   Tagashira ................ G01S 17/04
                                                               250/216
2010/0194583 A1    8/2010   Kawabata
(Continued)

FOREIGN PATENT DOCUMENTS

DE     102009021764 A1 * 12/2010 ............ G01S 17/42
DE     102017203242 A1    8/2018
(Continued)

OTHER PUBLICATIONS

Ronny De Loor, Lars Penning, Rick Slagle. "Polygon Laser Scanning", Mar. 2014, Laser Technik Journal, pp. 32-34 (Year: 2014).*

*Primary Examiner* — Yuqing Xiao
*Assistant Examiner* — Clara G Chilton
(74) *Attorney, Agent, or Firm* — NORTON ROSE FULBRIGHT US LLP; Gerard A. Messina

(57) ABSTRACT

A LIDAR sensor including an optical transmitting unit configured to emit a scanning beam in the direction of an optical axis of the optical transmitting unit, an optical receiving unit configured to receive the reflected scanning beam after the scanning beam has been reflected in the surroundings, a deflection optical system including a first mirror surface and a second mirror surface, the optical axis of the optical transmitting unit being directed onto the first mirror surface, and the optical axis of the optical receiving unit being directed onto the second mirror surface, the optical transmitting unit and the optical receiving unit being situated in an optical path of the LIDAR sensor on a shared first side of the deflection optical system, and a scanning unit situated in the optical path of the LIDAR sensor on a second side of the deflection optical system and configured to guide the scanning beam.

14 Claims, 4 Drawing Sheets

(56) References Cited

U.S. PATENT DOCUMENTS

| | | | |
|---|---|---|---|
| 2018/0284268 A1* | 10/2018 | McWhirter | G01S 7/4816 |
| 2019/0154889 A1* | 5/2019 | McWhirter | G02B 5/09 |
| 2019/0271767 A1 | 5/2019 | Keilaf et al. | |
| 2019/0257946 A1* | 8/2019 | Ando | G01S 17/08 |
| 2019/0285734 A1* | 9/2019 | Van Lierop | G01S 7/4863 |

FOREIGN PATENT DOCUMENTS

| | | |
|---|---|---|
| DE | 102017221530 A1 | 6/2019 |
| DE | 102020200098 A1 | 7/2021 |
| EP | 2682781 A2 | 1/2014 |
| EP | 2937715 B1 | 10/2015 |
| EP | 3540468 A1 | 9/2019 |
| JP | S6154187 B2 | 11/1986 |
| JP | 2011059111 A | 3/2011 |
| JP | 2014029317 A | 2/2014 |
| JP | 2017096674 A | 6/2017 |
| JP | 2019158693 A | 9/2019 |
| WO | 2018147454 A1 | 8/2018 |
| WO | 2019163210 A1 | 8/2019 |

\* cited by examiner

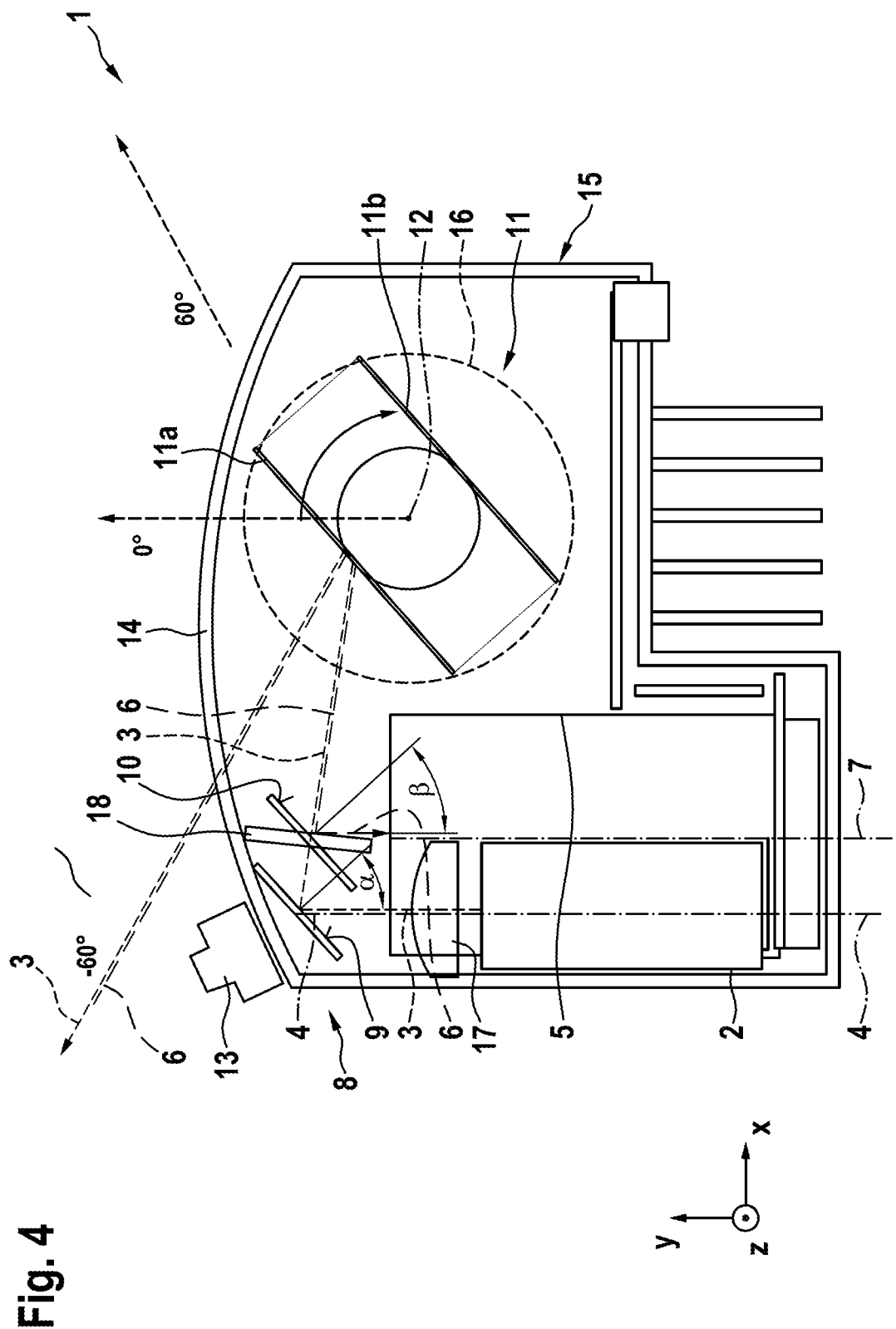

LIDAR SENSOR

CROSS REFERENCE

The present application claims the benefit under 35 U.S.C. § 119 of German Patent Application No. DE 102019218005.1 filed on Nov. 22, 2019, which is expressly incorporated herein by reference in its entirety.

FIELD

The present invention relates to a LIDAR sensor including an optical transmitting unit, an optical receiving unit, and a scanning unit.

BACKGROUND INFORMATION

In the automotive field, thus far there have been LIDAR sensors that are designed primarily for driver assistance systems. These LIDAR sensors often have a field of view that is forward-facing. Although they have a large horizontal visual field, the range decreases greatly with increasing distance from the center axis.

When LIDAR sensors are used for autonomous driving, systems including an active rotor are used in test vehicles. These systems naturally have a very large horizontal opening angle and a constant range across this opening angle. However, these systems have several disadvantages for series production in vehicles. Thus, a portion of the electronics system rotates and the other portion is stationary. As a result, significantly more electronics are required, including energy and data transmission between the stator and the rotor. This results in increased costs and reduces the service life. In addition, the requirements for stability of the LIDAR sensor due to the vibrations caused by the vehicle result in a complicated rotor design. For this reason, large bearings and a very powerful motor are necessary. Furthermore, the electronics system of the rotor can be cooled only via the air in the LIDAR sensor. For a given limiting temperature of the electronic components, the allowable housing temperature of the LIDAR sensor is therefore usually low. However, combined with the high power consumption, the demand on the cooling by the vehicle is very high. In addition, the LIDAR sensor has a very large design. This makes integration into a vehicle difficult.

In addition, in such a LIDAR sensor including an active rotor, the origin of the scanning system is on the sensor center axis. Therefore, a large area around the LIDAR sensor must be kept free at a vehicle body when the LIDAR sensor is to be used on a vehicle.

SUMMARY

The LIDAR sensor according to an example embodiment of the present invention includes an optical transmitting unit, an optical receiving unit, a deflection optical system, and a scanning unit. The optical transmitting unit is configured to emit a scanning beam in the direction of an optical axis of the optical transmitting unit. The optical receiving unit is configured to receive the reflected scanning beam after the scanning beam has been reflected in the surroundings of the LIDAR sensor, the optical receiving unit having a primary receiving direction that is directed along an optical axis of the optical receiving unit. The deflection optical system includes a first mirror surface and a second mirror surface, the optical axis of the optical transmitting unit being directed onto the first mirror surface, and the optical axis of the optical receiving unit being directed onto the second mirror surface, the optical transmitting unit together with the optical receiving unit being situated in an optical path of the LIDAR sensor on a shared first side of the deflection optical system.

The scanning unit is situated in the optical path of the LIDAR sensor on a second side of the deflection optical system and configured to guide the scanning beam, reflected from the deflection optical system, in different directions in order to scan the surroundings of the LIDAR sensor with the scanning beam and guide the reflected scanning beam back to the deflection optical system.

The optical transmitting unit is in particular a laser via which the scanning beam is emitted. The optical axis of the optical transmitting unit is the direction that defines a central propagation direction of the scanning beam. The optical receiving unit is an optical sensor that is configured in particular to receive light in the wavelength in which it is emitted by the optical transmitting unit. The optical receiving unit has a primary receiving direction that is directed along an optical axis of the optical receiving unit. This means that the optical receiving unit may be oriented in a certain direction in order to detect incident light from this direction. This direction is the primary receiving direction. The orientation of the optical axis of the optical receiving unit corresponds to this primary receiving direction. If the optical transmitting unit and/or the optical receiving unit include(s) a lens that is situated in front of an active transmission area or reception area of the optical transmitting unit or of the optical receiving unit, the optical axis of the optical transmitting unit or of the optical receiving unit corresponds to the optical axis of the lenses situated in front of same.

The reflected scanning beam results from the scanning beam after the scanning beam has been scattered in the surroundings of the LIDAR sensor. The reflected scanning beam is thus a reflected component of the scanning beam.

The deflection optical system includes one or multiple optical elements that are suitable for influencing a pattern of the emitted scanning beam and of the received reflected scanning beam. Thus, the deflection optical system includes a first mirror surface and a second mirror surface. The first mirror surface is preferably the surface of a first mirror, and the second mirror surface is preferably the surface of a second mirror. However, the first mirror surface and the second mirror surface are optionally different portions of a shared mirror surface of a single mirror. The optical transmitting unit, together with the optical receiving unit, is situated in an optical path of the LIDAR sensor on a shared first side of the deflection optical system. This means that the optical transmitting unit and the optical receiving unit are directed onto the deflection optical system from a shared side. The optical path is either an optical transmission path or an optical reception path. In particular, the optical path is a combination of the optical transmission path and the optical reception path. The shared side is defined by a shared direction from which the scanning beam strikes the deflection optical system and in which the reflected scanning beam is projected in order to strike the optical receiving unit. The optical path of the LIDAR sensor is a connection between the optical transmitting unit including the optical receiving unit via the deflection optical system, and the scanning unit, up to a point at which the scanning beam exits the LIDAR sensor, and the reflected scanning beam enters the LIDAR sensor.

The scanning unit is situated in the optical path of the LIDAR sensor on a second side of the deflection optical system. This means that the scanning beam is projected onto the scanning unit by the optical transmitting unit via the first mirror surface of the deflection optical system. Conversely, the reflected scanning beam is projected onto the second mirror surface of the deflection optical system by the scanning unit, and from there is reflected onto the optical receiving unit. The scanning unit is in particular a rotating mirror system or an oscillating mirror.

As a result of the optical transmitting unit and the optical receiving unit being directed onto the deflection optical system from the same direction, light that is emitted by the optical transmitting unit as a scanning beam may possibly be reflected directly into the optical receiving unit, so that it is "blinded" for a certain period of time. It is therefore advantageous when the optical receiving unit is a receiving unit with a particularly small regeneration time, in particular a SPAD-based receiver. In this way, a transmission path and a reception path of the LIDAR sensor may be interlaced in a particularly compact manner. A particularly compact LIDAR sensor is thus provided. In addition, due to the arrangement according to the present invention of the optical transmitting unit together with the optical receiving unit opposite from the scanning unit, a particularly compact system is provided, since the base surface of such a LIDAR sensor is particularly small. Thus, an optical axis of the optical transmitting unit and of the optical receiving unit is not to be directed directly onto the scanning unit. This scanning unit may thus be situated near the optical transmitting unit and the optical receiving unit, and the scanning beam or the reflected scanning beam is deflected onto the scanning unit via the deflection optical system.

Via the deflection optical system, an optical path of the emitted scanning beam and of the reflected scanning beam is deflected in such a way that the scanning beam is guided onto the scanning unit in a certain direction when the optical axis of the optical transmitting unit is followed, starting from the transmitting unit. Similarly, the reflected scanning beam is deflected onto the optical axis of the optical receiving unit by the deflection optical system when the scanning beam, coming from the scanning unit from the certain direction, is reflected onto the deflection optical system.

A LIDAR sensor that has a particularly large horizontal visual range is thus provided in accordance with an example embodiment of the present invention. The visual range is the area in the surroundings of the LIDAR sensor that is scanned by the scanning beam of the LIDAR sensor. The scanning beam of the LIDAR sensor passes through the visual range in the horizontal direction, since the scanning beam is moved in this direction by the scanning unit. The horizontal direction is thus in particular a direction that is perpendicular to a rotational axis of the scanning unit. The horizontal visual range is particularly large, since the optical transmitting unit and the optical receiving unit, due to the deflection optical system, may be situated in such a way that they do not limit the visual range. A particularly large visual range is thus made possible, allowing a virtually constant range with a relatively large vertical visual range.

Thus far, a LIDAR sensor including a rotating mirror has not been suitable for a design with a constant range, since in the technology up to now, the optical transmission area and reception area must be strictly separated due to the fact that the receiver (or the amplifier electronics system) has a long recovery time, resulting in transmission-reception coupling in the sensor for a large dead range in the near field of the sensor. By use of the LIDAR sensor according to the present invention, a large range is ensured; in addition, a large transmission aperture is made possible to ensure conformity with the requirements and limits of laser class 1, as well as a large reception aperture to receive preferably a large amount of light from the target. The situation is thus avoided that, due to a large vertical visual field, a required installation space for the transmission area and reception area becomes unnecessarily large, since a large amount of space has been necessary thus far for separating the transmission area and the reception area.

Preferred refinements of the present invention are described herein.

The optical axis of the optical transmitting unit is preferably situated in parallel to the optical axis of the optical receiving unit. This means that the optical transmitting unit and the optical receiving unit are oriented in the same direction, thus allowing a particularly compact design of the LIDAR sensor.

It is also advantageous when an incidence angle between the optical axis of the optical transmitting unit and the first mirror surface is equal to 45° or less than 45°, and/or an incidence angle between the optical axis of the optical receiving unit and the second mirror surface is equal to 45° or less than 45°. In particular, when the incidence angle is less than 45°, the scanning unit may to a great extent be situated overlapping with the optical transmitting unit and/or the optical receiving unit. The required installation space in a housing of the LIDAR sensor is thus reduced. This is true in particular when the incidence angle between the optical axis of the optical transmitting unit and the first mirror surface is less than 45°, and at the same time the incidence angle between the optical axis of the optical receiving unit and the second mirror surface is less than 45° and at the same time the optical axes of the optical transmitting unit and of the optical receiving unit are situated in parallel to one another. An incidence angle is an angle that results between a vertical line on one of the mirror surfaces and the particular optical axis onto which it is directed.

It is advantageous when a rotational axis of the scanning unit, along a direction of the optical axis of the optical transmitting unit, starting from a point at which the optical axis in the optical transmitting unit meets the first mirror surface, is situated on the side of the first mirror surface on which the optical transmitting unit is also situated, and/or along a direction of the optical axis of the optical receiving unit, starting from a point at which the optical axis of the optical receiving unit meets the second mirror surface, is situated on the side of the first mirror surface on which the optical receiving unit is also situated. In other words, this means that the rotational axis of the scanning unit is situated in such a way that the scanning beam emitted by the optical transmitting unit as well as the reflected scanning beam transmitted back to the optical receiving unit are reflected at an acute angle at the particular mirror surface of the deflection optical system in order to strike the scanning unit. As a function of the distance between the deflection optical system and the scanning unit, the scanning unit may be displaced along the optical axes in the LIDAR sensor on one side of the optical transmitting unit or of the optical receiving unit. The shape of the LIDAR sensor housing may thus be optimized in order to provide a preferably compact LIDAR sensor.

In addition, it is advantageous when the optical axis of the optical transmitting unit and/or the optical axis of the optical receiving unit are/is oriented in parallel to a rotation plane of the scanning unit. The rotation plane is the plane in which a visual field of the LIDAR sensor extends. The rotation plane is thus a plane that is perpendicular to a rotational axis of the scanning unit, the scanning unit in particular being a rotating mirror system or an oscillating mirror system. The optical axis of the optical transmitting unit and the optical axis of the optical receiving unit are typically situated in different rotation planes of the scanning unit that are situated in parallel to one another. In particular, a rotational axis of the scanning unit is perpendicular to the optical axis of the scanning unit and/or to the optical axis of the receiving unit.

It is further preferred that the optical scanning unit is a line laser, a laser line of the line laser being oriented in parallel to a rotational axis of the scanning unit. This means that the scanning beam has the beam shape of a line, the scanning beam being moved at a right angle to the orientation of the line shape of the scanning beam. An area in the surroundings of the LIDAR sensor may thus be scanned, a movement of the scanning beam via the scanning unit about the rotational axis of the scanning unit being sufficient to detect points in multiple planes. Reflecting areas of the scanning unit may be jointly utilized by the emitted scanning beam and the reflected scanning beam. In other words, this means that a mirror of the scanning unit is completely illuminated by the optical transmitting unit; i.e., the line-shaped scanning beam is also radiated onto the areas of the scanning unit that are utilized for deflecting the reflected scanning beam onto the deflection unit. A particularly large mirror surface is thus utilized in order to guide sufficient light back to the optical receiving unit.

It is also advantageous when an optical transmission path and an optical reception path of the LIDAR sensor are interlaced between the scanning unit and the deflection optical system. This means that it is advantageous when a path of the scanning beam intersects with a path of the reflected scanning beam. A particularly compact design of the LIDAR sensor is thus made possible.

In addition, it is advantageous when the optical axis of the optical transmitting unit in a direction of the rotational axis of the scanning unit is offset relative to the optical axis of the optical receiving unit. In other words, this means that the optical axis of the optical transmitting unit and the optical axis of the optical receiving unit are situated in different planes, both of which are perpendicular to a rotational axis of the scanning unit. The optical transmitting unit and the optical receiving unit are thus situated in different planes of the LIDAR sensor. If the rotational axis is considered as a vertical axis of the LIDAR sensor, the optical transmitting unit and the optical receiving unit are thus situated one above the other. A base surface of the LIDAR sensor may thus be minimized. Alternatively, the optical transmitting unit and the optical receiving unit are situated next to one another in a shared plane of the LIDAR sensor. Thus, the optical axis of the optical transmitting unit and the optical axis of the optical receiving unit are in particular situated in a shared plane that is perpendicular to the rotational axis of the scanning unit.

Furthermore, it is advantageous when a minimal distance of the optical axis of the optical transmitting unit from a rotational axis of the scanning unit is unequal to a minimal distance of the optical axis of the optical receiving unit from the rotational axis of the scanning unit. This means that the optical transmitting unit is preferably at a greater or lesser distance from the scanning unit, i.e., the optical receiving unit. The optical transmitting unit and the optical receiving unit are preferably situated one above the other. This means that the optical transmitting unit and the optical receiving unit, as viewed from their optical axes, are preferably diagonally offset relative to one another when the rotational axis of the scanning unit is regarded as the vertical axis of the LIDAR sensor. In particular, when the optical transmitting unit and the optical receiving unit have a cylindrical design where the cylindrical shape has the particular optical axis as a cylinder axis, the optical transmitting unit and the optical receiving unit may be situated particularly near to one another, as the result of which the size of the LIDAR sensor may be minimized. The optical transmitting unit and the optical receiving unit are preferably situated directly adjacent to one another.

Moreover, it is advantageous when the LIDAR sensor includes a cleaning unit that is configured to clean a viewing window of the LIDAR sensor, the cleaning unit, starting from the optical transmitting unit and the optical receiving unit, being situated behind the deflection optical system. Since the scanning beam emitted by the optical transmitting unit does not strike this area due to it previously being deflected by the deflection optical system, this area of the viewing window does not have to be kept free in order to avoid an interruption of the scanning beam. This area is therefore particularly suited for parking the cleaning unit when it is not needed. The cleaning unit is in particular a wiper unit, for example in a windshield wiper blade.

In addition, it is advantageous when the LIDAR sensor includes a housing with a viewing window, the scanning beam being emitted through the viewing window into the surroundings of the LIDAR sensor, the viewing window having a curvature, and a rotational axis of the scanning unit being situated in such a way that a rotational circumference of the scanning unit extends into a space that is situated within the curvature of the viewing window. The space within the curvature of the viewing window is a space that results between the viewing window and a straight line that directly connects two points of the viewing window to one another. The viewing window thus curves around the scanning unit, as the result of which a required installation space in a housing of the LIDAR sensor may be further reduced.

Furthermore, it is advantageous when a range of the LIDAR sensor is variable over its visual field, in particular that the range of the LIDAR sensor in a lateral area of the visual field is smaller than in a central area of the visual field. The lateral area is in particular a lateral area in the horizontal direction of the visual field. The LIDAR sensor may thus have a particularly compact design.

BRIEF DESCRIPTION OF THE DRAWINGS

Exemplary embodiments of the present invention are described in greater detail below with reference to the figures.

FIG. 4 shows a LIDAR sensor according to the present invention in a further specific embodiment of the present invention.

DETAILED DESCRIPTION OF EXAMPLE EMBODIMENTS

Figure 1:
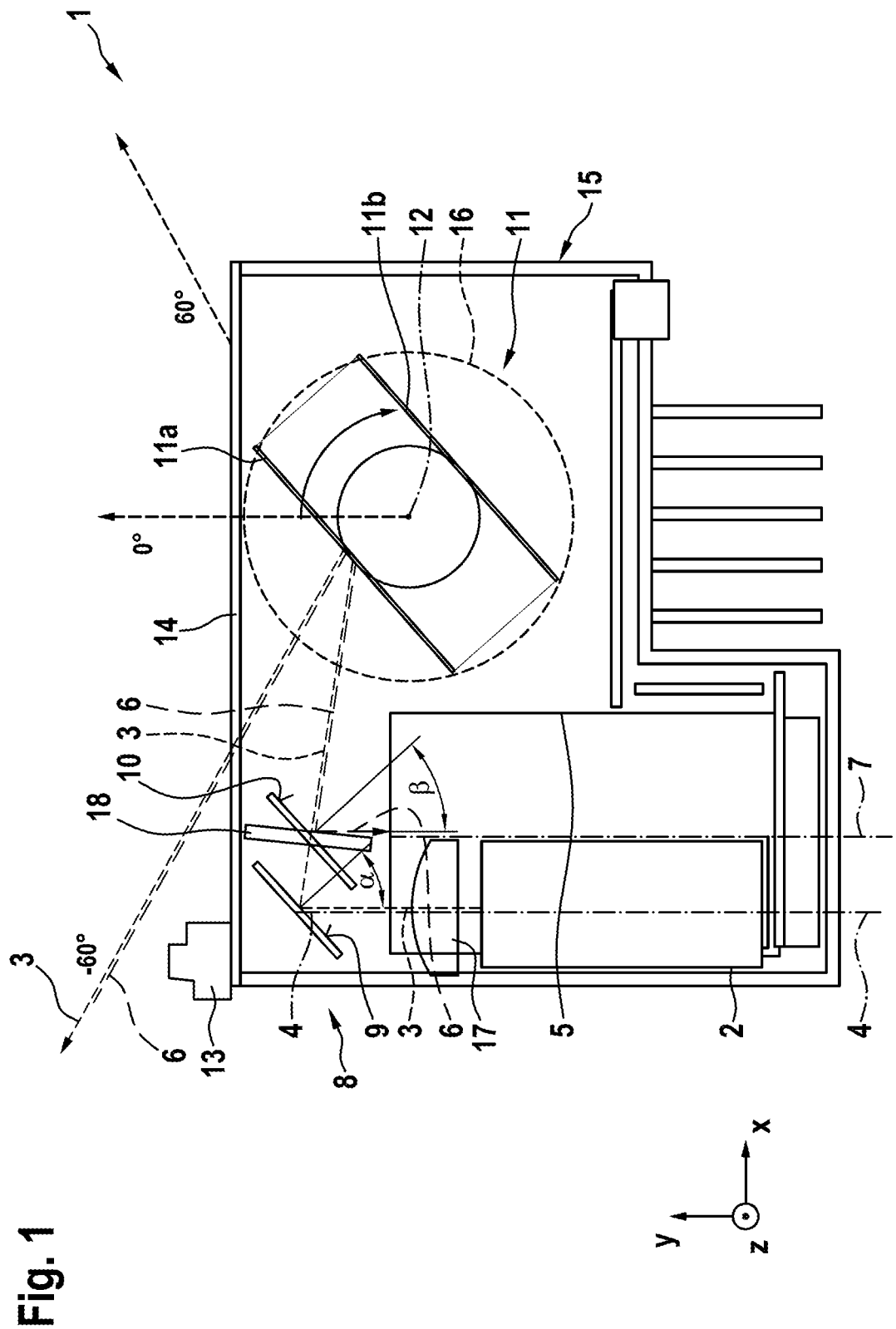
FIG. 1 shows a schematic illustration of a LIDAR sensor according to the present invention according to one specific embodiment of the present invention.

FIG. 1 shows a LIDAR sensor 1 according to one specific embodiment of the present invention. LIDAR sensor 1 is illustrated from a top view that depicts an XY plane. LIDAR sensor 1 includes an optical transmitting unit 2, an optical receiving unit 5, a deflection optical system 8, and a scanning unit 11. Optical transmitting unit 2, optical receiving unit 5, deflection optical system 8, and scanning unit 11 are situated at a housing 15 of the LIDAR sensor. One side of housing 15 includes a viewing window 14.

Optical transmitting unit 2 is configured to emit a scanning beam 3 in the direction of an optical axis 4 of optical transmitting unit 2. In this specific embodiment, optical transmitting unit 2 is a line laser, a laser line of the line laser being oriented in parallel to a rotational axis 12 of scanning unit 11 and emitted as a scanning beam 3. This means that the laser line generated by optical transmitting unit 2 in the illustration of LIDAR sensor 1 shown in FIG. 1 is oriented along a vertical axis of the LIDAR sensor that corresponds to a Z axis that is perpendicular to the plane of the drawing shown in FIG. 1. In the specific embodiment described here, optical axis 4 of optical transmitting unit 2 is situated in the center of the laser line emitted by the line laser. Optical axis 4 of optical transmitting unit 2 is thus a primary transmission direction of optical transmitting unit 2.

Optical receiving unit 5 is configured to receive a reflected scanning beam 6. Optical receiving unit 5 is preferably a SPAD-based sensor. Reflected scanning beam 6 is a reflected portion of emitted scanning beam 3 after it has been reflected in the surroundings of the LIDAR sensor and reflected back to the LIDAR sensor. The optical receiving unit has a primary receiving direction that is directed along an optical axis of the optical receiving unit. Optical receiving unit 5 is an optical sensor that converts a received optical signal, in the present case reflected scanning beam 6, into an electrical signal. Optical receiving unit 5 is a photosensor, for example. The position of optical axis 7 of optical receiving unit 5 corresponds to a primary receiving direction of optical receiving unit 5. In this specific embodiment, a lens is situated on a front side of the optical receiving unit. The lens is a convex or concave lens, for example. Optical axis 7 of optical receiving unit 5 corresponds to the optical axis of the lens situated at the input of optical receiving unit 5.

It is pointed out that optical axis 4 of optical transmitting unit 2 as well as optical axis 7 of optical receiving unit 5 are merely virtual axes, and are not structural elements of LIDAR sensor 1. Optical transmitting unit 2 and optical receiving unit 5 are situated in such a way that optical axis 4 of optical transmitting unit 2 is situated in parallel to optical axis 7 of optical receiving unit 5. Optical transmitting unit 2 and optical receiving unit 5 are situated directly adjacent to one another. In the illustration shown in FIG. 1, optical axes 4, 7 are offset relative to one another in an X direction and also in a Z direction.

Deflection optical system 8 includes a first mirror surface 9 and a second mirror surface 10. First mirror surface 9 is the surface of a first mirror, and second mirror surface 10 is the surface of a second mirror. This means that in this specific embodiment, deflection optical system 8 includes two separate mirrors with separate mirror surfaces 9, 10. In other specific embodiments, LIDAR sensor 1 may be designed in such a way that first mirror surface 9 and second mirror surface 10 are situated on a shared mirror.

Optical axis 4 of optical transmitting unit 2 is directed onto first mirror surface 9, and optical axis 7 of optical receiving unit 5 is directed onto second mirror surface 10. This means that an optical transmission path and an optical reception path of the LIDAR sensor are deflected by deflection optical system 8. Scanning beam 3 emitted by optical transmitting unit 2 is thus reflected at first mirror surface 9 and projected onto scanning unit 11. Similarly, a received reflected scanning beam 6 coming from scanning unit 11 is reflected at second mirror surface 10 and projected onto optical receiving unit 5. Optical transmitting unit 2, together with optical receiving unit 5, is situated in an optical path of LIDAR sensor 1 on a shared first side of deflection optical system 8. The optical path is a combination of the optical transmission path and the optical reception path. As a result of optical transmitting unit 2 together with optical receiving unit 5 being situated in the optical path of LIDAR sensor 1 on a shared first side of deflection optical system 8, they face deflection optical system 8 from a shared direction. This means that optical axes 4, 7 follow optical transmitting unit 2 and optical receiving unit 5, starting from particular associated optical unit 2, 5, then strike deflection optical system 8 from a shared direction. A shared direction is in particular to be regarded as a shared direction when an optical path of scanning beam 3 and an optical path of the reflected scanning beam between deflection optical system 8 and optical transmitting unit 2 or optical receiving unit 5 extend next to one another; i.e., both intersect a plane that is either perpendicular to optical axis 4 of optical transmitting unit 2 or perpendicular to optical axis 7 of optical receiving unit 5.

Scanning unit 11 is situated in the optical path of LIDAR sensor 1, and is situated on a second side of deflection optical system 8. The optical path of LIDAR sensor 1 thus begins at optical transmitting unit 2 and optical receiving unit 5, and extends across deflection optical system 8 to scanning unit 11, and from there extends into the surroundings of LIDAR sensor 1 via viewing window 14. In this specific embodiment, scanning unit 11 is a rotating mirror system that includes two individual rotating mirrors, in the present case a first rotating mirror 11a and a second rotating mirror 11b. Rotating mirrors 11a, 11b of scanning unit 11 rotate about rotational axis 12. Rotating mirrors 11a, 11b are oriented in parallel to rotational axis 12. Due to the rotation of the rotating mirror system of scanning unit 11, scanning beam 3 is emitted in different directions, for example in an angular range of −60° to +60°, in order to detect a visual field of 120°. As a function of the position of rotating mirrors 11a, 11b of the rotating mirror system of scanning unit 11, reflected scanning beam 6 is received from the same area into which scanning beam 3 was transmitted, so that scanning beam 3 is scattered at an object.

The first mirror and thus first mirror surface 9 is situated in front of optical transmitting unit 2 in such a way that an incidence angle α of less than 45° results between optical axis 4 of optical transmitting unit 2 and first mirror surface 9. In alternative specific embodiments, incidence angle α is equal to 45°. Similarly, the second mirror with second mirror surface 10 is situated in front of optical receiving unit 5 in such a way that an incidence angle β of less than 45° results between optical axis 7 of optical receiving unit 5 and second mirror surface 10. In alternative specific embodiments, incidence angle β is equal to 45°. It is therefore apparent from FIG. 1 that scanning beam 3 and reflected scanning beam 6 are deflected by an angle of less than 90° by deflection optical system 8. It is thus possible for scanning unit 11 to be displaced in the direction of optical axes 4, 7 in a direction of optical transmitting unit 2 and/or of optical receiving unit 5. Mirror surface 14 may thus move nearer to optical transmitting unit 2 and optical receiving unit 5, as the result of which a particularly compact LIDAR sensor 1 is provided. In other words, this means that rotational axis 12 of the scanning unit, along a direction of optical axis 4 of optical transmitting unit 2, starting from a point at which optical axis 4 of optical transmitting unit 2 meets first mirror surface 9, is situated on a side of first mirror surface 9 on which optical transmitting unit 2 is also situated. At the same time, this means that rotational axis 12 of scanning unit 11, along a direction of optical axis 7 of the optical receiving unit, starting from a point at which optical axis 7 of optical receiving unit 5 meets second mirror surface 10, is situated on the side of first mirror surface 10 on which the optical receiving unit is also situated.

Optical axis 4 of optical transmitting unit 2 and optical axis 7 of optical receiving unit 5 are oriented in parallel to a rotation plane of scanning unit 11. The rotation plane of scanning unit 11 is perpendicular to rotational axis 12 of scanning unit 11, and in FIG. 1 corresponds to a plane that is in parallel to the XY plane. Scanning unit 11 and optical transmitting unit 2 are situated in the same plane in LIDAR sensor 1 along the vertical axis, and thus, rotational axis 12 of LIDAR sensor 1. Scanning unit 11 and optical receiving unit 5 are situated in the same plane in LIDAR sensor 1 along the vertical axis, and thus, rotational axis 12 of LIDAR sensor 1. Optical transmitting unit 2 is situated along rotational axis 12 above optical receiving unit 5, and scanning unit 11 is situated next to optical scanning unit 2 and also next to optical receiving unit 5.

An optical transmission path and an optical reception path of LIDAR sensor 1 are interlaced at least between scanning unit 11 and deflection optical system 8. This means that emitted scanning beam 3 and received scanning beam 6 between scanning unit 11 and deflection optical system 8 pass through a shared spatial area of LIDAR sensor 1. In this regard, reference is made to FIG. 2.

Figure 2:
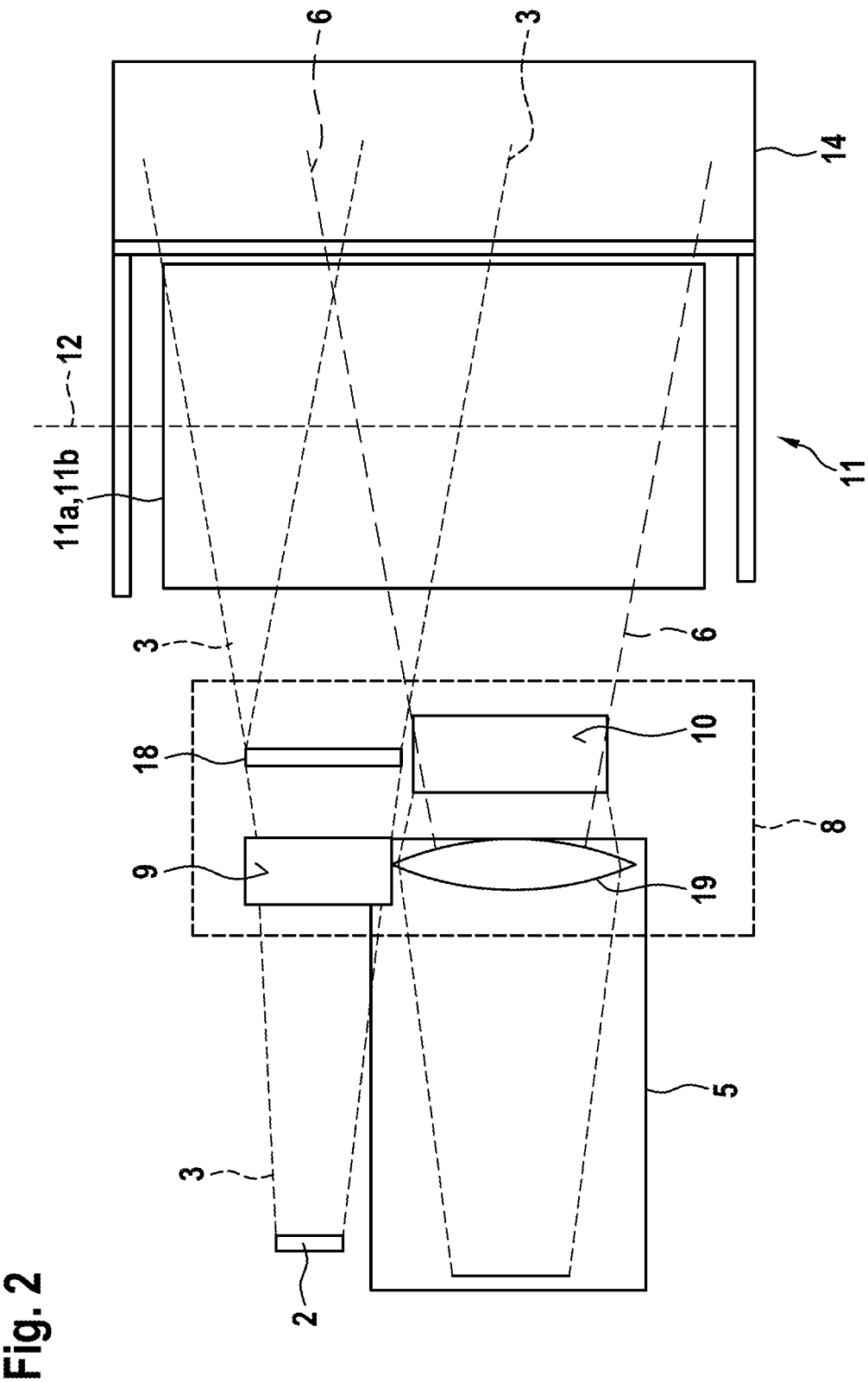
FIG. 2 shows a schematic illustration of an optical path of the scanning beam and of an optical path of the reflected scanning beam in the LIDAR sensor according to the present invention.

FIG. 2 is a schematic illustration of the optical path of LIDAR sensor 1. The optical path of LIDAR sensor 1 is unfolded, by which it is apparent that the optical transmission path and the optical reception path of LIDAR sensor 1 are interlaced. It is apparent that scanning beam 3, starting from optical transmitting unit 2, is projected onto first mirror surface 9, and from there is projected onto scanning unit 11, in particular one of rotating mirrors 11a, 11b of scanning unit 11. Starting from scanning unit 11, scanning beam 3 is emitted into the surroundings of LIDAR sensor 1 through viewing window 14.

In addition, it is apparent that reflected scanning beam 6 is projected from scanning unit 11 onto second mirror surface 10, and from there onto optical receiving unit 5. It is apparent that scanning beam 3 and reflected scanning beam 6 utilize the same areas of the mirror of the rotating mirror system of scanning unit 11. Between deflection optical system 8 and scanning unit 11, scanning beam 3 and reflected scanning beam 6 pass through the same area within LIDAR sensor 1. The optical transmission path, i.e., the area through which scanning beam 3 passes, and the optical reception path, i.e., the area through which reflected scanning beam 6 passes, are thus interlaced.

It is pointed out that further optical elements, in particular lenses, may be included in the optical transmission path, i.e., the path that scanning beam 3 follows, as well as in the optical reception path, i.e., the path that reflected scanning beam 6 follows. Thus, for example, in FIG. 1 a first lens 17 and a second lens 18 are situated in the optical transmission path.

First lens 17 is situated between deflection optical system 8 and optical transmitting unit 2, and second lens 18 is situated between deflection optical system 8 and scanning unit 11. It is noted that in further specific embodiments, for example only second lens 18 is situated in LIDAR sensor 1, as illustrated in FIG. 2, for example. In addition, optical transmitting unit 2 as well as optical receiving unit 5 may also include further lenses, as illustrated in FIG. 2, for example, in which optical receiving unit 5 includes a converging lens or a receiving lens 19. One or multiple lenses may be situated upstream or downstream from deflection optical system 8 in the optical path of LIDAR sensor 1, and thus either in the optical transmission path or in the optical reception path.

FIG. 2 shows an interlacing of the transmission area and the reception area. The reception aperture is situated in the plane of second lens 18 and the underlying second mirror, also referred to as the receiving deflection mirror. Starting from this plane until reaching the windshield, an area with the maximum vertical incidence angle is to be kept free. Due to the interlacing, only the area from the lower edge of optical receiving unit 5 to the upper edge of optical transmitting unit 2 is relevant. In a system with paths to be separated, the transmitter would have to be moved far upwardly in order for the lower edge of the transmitter on the windshield to rest above the upper edge of the receiver on the windshield.

Figure 3:
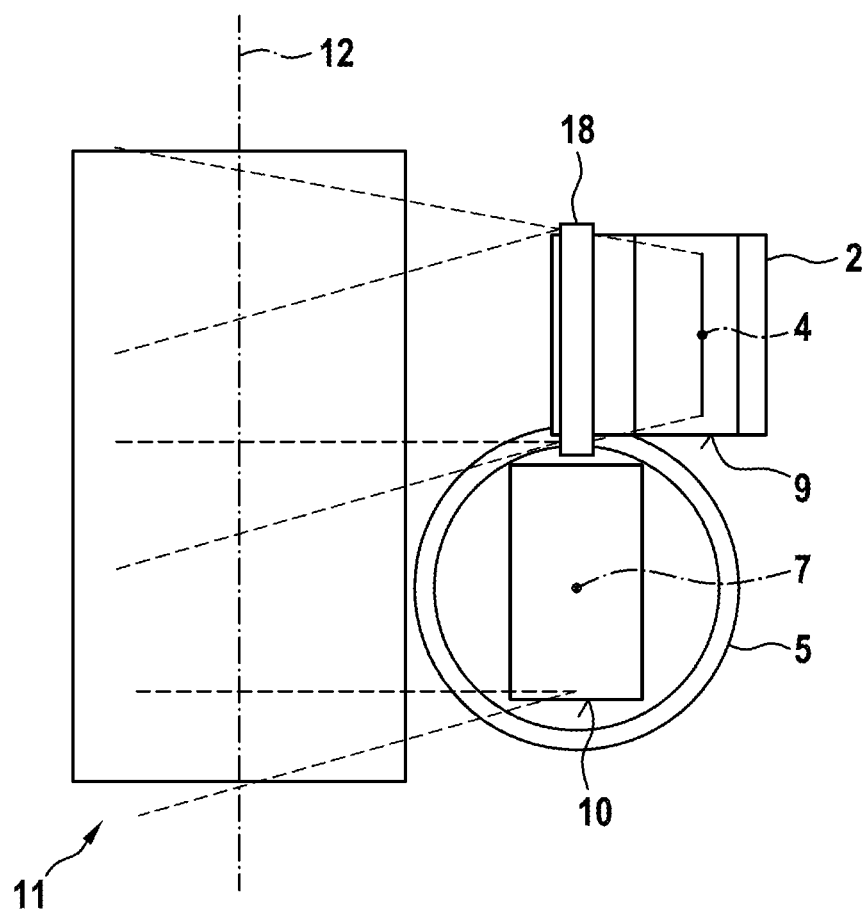
FIG. 3 shows a schematic illustration of the LIDAR sensor in a front view.

The arrangement of optical transmitting unit 2 with respect to optical receiving unit 5 is illustrated once more in FIG. 3 in greater detail. FIG. 3 shows LIDAR sensor 1, shown in FIG. 1, in a second view in which an XZ plane is depicted. Optical axis 4 of optical transmitting unit 2 is offset relative to optical axis 7 of optical receiving unit 5 in a direction of rotational axis 12 of scanning unit 11. Thus, optical transmitting unit 2 in FIG. 3 is situated above optical receiving unit 5, with both optical transmitting unit 2 and optical receiving unit 5 situated next to scanning unit 11.

At the same time, a minimal distance of optical axis 4 of optical transmitting unit 2 from rotational axis 12 of scanning unit 11 is unequal to a minimal distance of optical axis 7 of optical receiving unit 5 from rotational axis 12 of scanning unit 11. In other words, this means that optical transmitting unit 2 is situated farther from scanning unit 11 than is optical receiving unit 5. Optical transmitting unit 2 and optical receiving unit 5 are thus situated in an XZ plane of LIDAR sensor 1, offset relative to one another. Optimal use may thus be made of an installation space in housing 15 of LIDAR sensor 1, since in particular when the optical transmitting unit and optical receiving unit 5 have a cylindrical shape or at least an essentially cylindrical shape, the entire installation height is required, which is less than the shared height of optical transmitting unit 2 plus the height of optical receiving unit 5.

FIG. 3 thus shows a view of LIDAR sensor 1 from the front. By use of the deflection mirror on the reception side, i.e., the second mirror, a lens system may be moved very near to the reception aperture without disturbing the comparatively large receiving lens 19. The laser may be situated laterally above receiving lens 19, so that the installation width as well as the installation height may be optimized.

LIDAR sensor 1 optionally includes a cleaning unit 13 that is configured to clean viewing window 14 of LIDAR sensor 1; cleaning unit 13, starting from optical transmitting unit 2 and optical receiving unit 5, is situated behind deflection optical system 8. Due to emitted scanning beam 3 being deflected by deflection optical system 8, a dead space results behind deflection unit 8 from the viewpoint of optical transmitting unit 2, through which scanning beam 3 does not pass during a scanning operation. It is thus advantageous when a cleaning unit 13, in particular a wiper unit, finds a park position in this area in which it may be placed when it is not needed.

Optionally, a range of LIDAR sensor 1 is variable over its visual field. The range of LIDAR sensor 1 in a lateral area of the visual field is smaller than in a central area of the visual field. The lateral area is in particular a lateral area in the horizontal direction of the visual field.

FIG. 4 shows a LIDAR sensor 1 according to a further specific embodiment of the present invention. The further specific embodiment of the present invention essentially corresponds to the specific embodiments of the present invention described above. LIDAR sensor 1, the same as in the preceding specific embodiments, includes a housing 15 with viewing window 14. Scanning beam 3 is emitted into the surroundings of LIDAR sensor 1 through viewing window 14. However, viewing window 14 is shaped in such a way that it has a curvature in a direction passing circumferentially around this rotational axis 12 of scanning unit 11. Rotational axis 12 is not necessarily the center of curvature. Scanning unit 11 and viewing window 14 are situated relative to one another in such a way that a rotational circumference of 16 of scanning unit 11 extends into a space that is situated within the curvature of viewing window 14. It is thus apparent that a line that connects the outer ends of viewing window 14 intersects rotational circumference 16 of scanning unit 11.

A LIDAR sensor 1 according to the present invention utilizes the short recovery time of an integrated SPAD-based receiver to interlace the transmission path and reception path with one another. Significant space is thus saved. In addition, the aperture is made rectangular with a small width. The transmission aperture and the reception aperture have the same width.

To optimize the width of the mirror of scanning unit 11, the optical main axis is rotated by an angle from the Y axis of LIDAR sensor 1. The width of rotating mirror 11a, 11b is aperture width/sin (incidence angle). The incidence angle is defined by the maximum horizontal scanning angle and the rotation of the main axis.

To allow the rotation of the main axis and to minimize the width of LIDAR sensor 1, optical axes 4, 7 of transmitting unit and receiving unit 2, 5 are oriented in the X axis direction. Deflection from optical transmitting unit/receiving unit 2, 5 onto the optical main axis is carried out using a fixed deflection mirror in each case.

To optimize the height of the transmission aperture, the last (diverging) lens is in a line with the deflection mirror of the receiver, i.e., the second mirror. Optionally, a shared deflection mirror may also be used for the transmitter and the receiver. However, this would result in a comparatively large distance between the transmission area and the reception area. Therefore, optical transmitting unit 2 is placed slightly to the side of the center axis of optical receiving unit 5.

In order for the beam path in the direction of the windshield, and thus viewing window 14, to be disturbed as little as possible, the angle sensor for the mirror of scanning unit 11 is placed very near to the housing wall. To optimize the height of LIDAR sensor 1, a slight reduction of the range in the corners (large horizontal and vertical opening angles) may be accepted.

As a result of the arrangement of the transmitting deflection mirror and the receiving deflection mirror, i.e., the first and second mirrors of deflection optical system 8, there is an area of the windshield that is not situated in the visual field of LIDAR sensor 1. A windshield wiper may be parked in this area, and an optional windshield heater may be contacted in this area.

Based on the specific embodiments described above, the LIDAR sensor has the following characteristics, for example:

horizontal visual range: 120°
vertical visual range: 21°
horizontal divergence: 0.1°
aperture width: 16 mm
rotation of the optical main axis: 6°
aperture height of the transmitter: 34 mm
aperture height of the receiver: 28 mm
distance from the upper edge of the reception aperture to the
lower edge of the transmission aperture: 2 mm
height of the windshield (optically transparent area): 94 mm In addition to the above-written disclosure, reference is explicitly made to the disclosure in FIGS. 1 through 4.

What is claimed is:

1. A LIDAR sensor, comprising:
an optical transmitting unit configured to emit a scanning beam in a direction of an optical axis of the optical transmitting unit;
an optical receiving unit configured to receive a reflected scanning beam after the scanning beam has been reflected in surroundings of the LIDAR sensor, the optical receiving unit having a primary receiving direction that is directed along an optical axis of the optical receiving unit;
a deflection optical system that includes a first mirror surface and a second mirror surface, the optical axis of the optical transmitting unit being directed onto the first mirror surface, and the optical axis of the optical receiving unit being directed onto the second mirror surface, the optical transmitting unit together with the optical receiving unit being situated in an optical path of the LIDAR sensor on a shared first side of the deflection optical system; and
a scanning unit situated in the optical path of the LIDAR sensor on a second side of the deflection optical system and configured to guide the scanning beam, reflected from the deflection optical system, in different directions to scan the surroundings of the LIDAR sensor with the scanning beam and guide the reflected scanning beam back to the deflection optical system;
wherein the scanning unit includes a first rotating mirror and a second rotating mirror, each of which rotate about a rotational axis, wherein the first rotating mirror and the second rotating mirror are oriented in parallel to the rotational axis, and
wherein a width of each of the rotating mirrors is defined as: aperture-width/sin (incidence angle), wherein the incidence angle is defined by a maximum horizontal scanning angle and a rotation of the rotational axis.

2. The LIDAR sensor as recited in claim 1, wherein the optical axis of the optical transmitting unit is situated in parallel to the optical axis of the optical receiving unit.

3. The LIDAR sensor as recited in claim 1, wherein:
an incidence angle between the optical axis of the optical transmitting unit and the first mirror surface is equal to 45 degrees or less than 45 degrees; and/or
an incidence angle between the optical axis of the optical receiving unit and the second mirror surface is equal to 45 degrees or less than 45 degrees.

4. The LIDAR sensor as recited in claim 1, wherein the optical axis of the optical transmitting unit and/or the optical axis of the optical receiving unit, is oriented in parallel to a rotation plane of the scanning unit.

5. The LIDAR sensor as recited in claim 1, wherein the optical transmitting unit is a line laser, a laser line of the line laser being oriented in parallel to a rotational axis of the scanning unit.

6. The LIDAR sensor as recited in claim 1, wherein a transmission path and a reception path of the LIDAR sensor between the scanning unit and the deflection optical system are interlaced.

7. The LIDAR sensor as recited in claim 1, wherein the optical axis of the optical transmitting unit in a direction of a rotational axis of the scanning unit is offset relative to the optical axis of the optical receiving unit.

8. The LIDAR sensor as recited in claim 1, wherein a minimal distance of the optical axis of the optical transmitting unit from a rotational axis of the scanning unit is unequal to a minimal distance of the optical axis of the optical receiving unit from the rotational axis of the scanning unit.

9. The LIDAR sensor as recited in claim 1, wherein the LIDAR sensor includes a cleaning unit that is configured to clean a viewing window of the LIDAR sensor, the cleaning unit, starting from the optical transmitting unit and the optical receiving unit, being situated above, in a y-direction, at least a portion of the deflection optical system.

10. The LIDAR sensor as recited in claim 1, wherein the LIDAR sensor includes a housing with a viewing window, the scanning beam being emitted through the viewing window into the surroundings of the LIDAR sensor, the viewing window having a curvature, and a rotational axis of the scanning unit being situated so that a rotational circumference of the scanning unit extends into a space that is situated within the curvature of the viewing window.

11. The LIDAR sensor as recited in claim 1, wherein a range of the LIDAR sensor is variable over its visual field, and the range of the LIDAR sensor in a lateral area of the visual field is smaller than in a central area of the visual field.

12. The LIDAR sensor as recited in claim 1, wherein to allow the rotation of the rotational axis and to minimize a width of the LIDAR sensor, optical axes of the optical transmitting unit and the optical receiving unit are oriented in an X axis direction.

13. The LIDAR sensor as recited in claim 12, wherein deflection from the optical transmitting unit and the optical receiving unit onto an optical main axis is carried out using a fixed deflection mirror in each case.

14. The LIDAR sensor as recited in claim 1, wherein deflection from the optical transmitting unit and the optical receiving unit onto an optical main axis is carried out using a fixed deflection mirror in each case.

* * * * *